3,243,470
SEPARATIONS PROCESS
George D. Davis and Earle C. Makin, Jr., El Dorado, Ark., assignors to Monsanto Company, a corporation of Delaware
No Drawing. Filed Dec. 27, 1960, Ser. No. 78,286
14 Claims. (Cl. 260—677)

The present invention relates to a process for the separation of mixtures of straight-chain hydrocarbons according to the degree of unsaturation. More particularly, the present invention relates to the use of a particular modified molecular sieve for the selective adsorption of the more unsaturated straight-chain compounds from admixture thereof with less unsaturated straight-chain hydrocarbons whereby the adsorbed unsaturated compounds may be readily removed from the modified molecular sieves.

Molecular sieves, as referred to herein, are zeolites, both naturally occurring and synthetic. These zeolites have innumerable internal cavities with entrance pores of uniform size, and only those molecules having critical diameters less than the diameters of these entrance pores may enter the internal cavities. Conversely, those molecules having critical diameters larger than the pore diameter are excluded from the internal cavities. The entrance pores may vary in diameter from approximately 3 to 15 angstroms, but it is a characteristic of these zeolites that any particular zeolite will possess pores of substantially uniform size.

Zeolites vary somewhat in composition, but generally contain the elements silicon, aluminum, and oxygen as well as alkali and/or alkaline earth elements such as sodium and calcium. Those zeolites which are useful as molecular sieves are defined in U.S. Patent 2,920,038. Commercially available molecular sieves generally are synthetic sodium and calcium alumino-silicate crystals. As synthesized, the crystals contain water of hydration which is driven out by heating. The removal of the water does not collapse or cause rearrangement of the crystal lattice with the result that a geometric network of empty cavities connected by channels are formed. Physically, molecular sieves are white powders with particles ranging in size from 1 to 5 microns in diameter. Each particle is a single crystal containing literally billions of tiny cavities or cages interconnected by channels of essentially uniform diameter. The particles may be bound together by a suitable porous binding material to form various size pellets.

The combined effect of the uniform pore diameter and strong surface forces which are characteristic of molecular sieves, essentially isolate compounds which have passed through the entrance pores into the internal cavities. Thus, molecular sieves have been suggested and utilized for a wide variety of separations. As applied to hydrocarbons these separations are between straight-chain and branched and/or cyclic hydrocarbons or between straight-chain hydrocarbons of varying degrees of unsaturation. Generally, those straight-chain compounds which are more polar in nature may be selectively adsorbed and held by molecular sieves.

It is well known in the art that unsaturated straight-chain compounds may be selectively adsorbed by molecular sieves. It is equally well known that as the unsaturation becomes greater, the affinity of the molecular sieves for the unsaturated compound increases, thus for example, it is possible to displace adsorbed n-mono-olefins with n-di-olefins and further to displace n-di-olefins with straight-chain acetylenic hydrocarbons. However, as the degree of unsaturation increases in the adsorbed compounds, so does the difficulty encountered in desorption increase. While n-mono-olefins have been desorbed to some small degree by the conventional methods of desorption known to the art, the desorption of n-di-olefins has met with considerably less success. Further, acetylenic hydrocarbons are virtually impossible to desorb by any of the conventional methods known to the art.

It is an object of this invention to provide a new and improved process for the separation of unsaturated straight-chain compounds according to their degree of unsaturation using molecular sieves. An additional object of this invention is to provide a new and novel procedure for the removal of adsorbed acetylenic, poly-olefinic and mono-olefinic hydrocarbons from molecular sieves. A still further object of this invention is to provide a more versatile adsorbent composition for the selective adsorption of straight-chain unsaturated hydrocarbons. Another object of this invention is to provide a one step process for the separation of hydrocarbons according to their degree of unsaturation by using a modified molecular sieve. A specific object of this invention is to provide a process wherein a hydrocarbon mixture comprising at least two hydrocarbon types selected from the group comprised of n-mono-olefinic, n-poly-olefinic and n-acetylenic hydrocarbons is contacted with a modified molecular sieve in such manner that the more unsaturated hydrocarbons are selectively adsorbed on the modified molecular sieve and then selectively hydrogenated to corresponding more saturated hydrocarbons. Additional objects will become apparent from the description of the invention herein disclosed.

In fulfillment of the object of this invention a method has been found whereby mixtures of unsaturated straight-chain compounds of varying degrees of unsaturation may be effectively separated by molecular sieves without impairment of the efficiency of the molecular sieves due to inability to desorb those compounds adsorbed and whereby desorption of adsorbed unsaturated hydrocarbons from molecular sieve internal cavities may be accomplished with little or no cracking, polymerization or cyclization of the unsaturated compounds. The method comprises contacting a mixture of unsaturated straight-chain hydrocarbons of varying degrees of unsaturation with a particualr modified molecular sieve in the presence of hydrogen. The modified molecular sieve is one prepared by immersion of an ordinary molecular sieve in a solution of a salt of a metal capable of causing catalytic hydrogenation and a suitable solvent therefor. After immersion for a period of time, the molecular sieve is filtered from the solution and dried. Then hydrogen is passed into contact with the treated molecular sieves at elevated temperatures for a period of time. The treatment of the molecular sieves with the metal salt does not alter the effective size of the internal cavities or the pore diameters, thus the selective adsorbing characteristics of the molecular sieves remain the same as before the treatment. Therefore, on contact of the mixture with the modified molecular sieves, the more unsaturated straight-chain hydrocarbons are selectively adsorbed and held in the internal cavities in preference to those straight-chain hydrocarbons which are less unsaturated. However, in the presence of the hydrogen, which may be introduced simultaneously with the feedstream, the adsorbed hydrocarbons are immediately hydrogenated to more saturated hydrocarbons, the amount of hydrogenation being dependent upon flow rates, hydrogen to feed ratios, temperature and pressure. Upon hydrogenation of the adsorbed hydrocarbons heat is produced by the exothermic hydrogenation reaction. The heat being applied directly at the site of adsorption facilitates desorption. Therefore, less external heat is necessary in the practice of the present invention than those which are known to the art. Thus, in the preferred embodiment of this invention, adsorption, hydrogenation and desorption take place in a single, continuous operation. It is not necessary, however, that the present invention be practiced in a single, continuous operation. The individual steps of this operation may be practiced separately. Examples of this would be found in an operation wherein hydrocarbons are first adsorbed, then mildly desorbed, and then those remaining after the mild desorption, hydrogenated and desorbed. Other modifications in these procedures will become apparent to those skilled in the art on consideration of specific applications of the present invention and may be practiced without departing from the spirit and scope accorded the present invention.

The following examples will serve to further explain and to illustrate the invention herein disclosed. It is to be understood, of course, that these examples are in no way to be construed as limiting the application, operation or conditions of this invention.

*Example I*

A cylindrical chamber was packed with 95 grams (135 cc.) of a modified molecular sieve containing therein 2.3 weight percent of cobalt. The modified molecular sieve was prepared by immersing a calcium-sodium-aluminosilicate having intercrystalline cavities with interconnecting channels and external pores of 5 angstroms diameter and marketed as Linde Type 5A molecular sieve, in a 3.9 percent by weight (.167 molar) aqueous solution of $CoCl_2$. The molecular sieves were in the form of $\frac{1}{16}$ inch diameter cylindrical pellets. The zeolite was allowed to remain in the solution at a temperature of approximately 25° C. until a color change in the solution indicated that a portion of the cobalt had been incorporated within the sieve. The zeolite was filtered from the solution, water washed and dried. After drying, hydrogen was passed over the molecular sieves for 2 hours at 450–500° C.

Seventy grams of a $C_3$ hydrocarbon feed comprised of 2.9 percent by weight propane, 87.7 percent by weight propylene, 1.7 percent by weight propadiene, and 7.8 percent by weight methylacetylene were passed over the modified molecular sieve concurrently with hydrogen. Three samples were taken, the analyses of which and conditions of operation during the sample period are given in the following table.

| Operating Conditions | Sample | | |
|---|---|---|---|
| | 1 | 2 | 3 |
| Temperature, °C | 223–259 | 253–257 | 295–300 |
| Pressure, p.s.i.a | 14.7 | 14.7 | 14.7 |
| Hydrocarbon feed flow, liters/hour | 4.05 | 8.10 | 8.10 |
| Hydrogen flow, liters/hour | 0.80 | 0.80 | 2.5 |
| Analysis (by weight percent): | | | |
| Propane | 0.70 | 0.45 | 0.70 |
| Propylene | 99.30 | 98.30 | 99.30 |
| Propadiene | none | 0.22 | none |
| Methylacetylene | none | 1.03 | none |
| Weight percent of total feed | 7.80 | 45.00 | 43.28 |

The amount of propylene originally present in the feed was approximately 61.4 grams of 87.7 percent purity. The products above represent a total of approximately 66.5 grams of propylene of 98.3 to 99.3 percent purity. This illustrates an important factor of the present invention. Not only are the impurities removed but they may be converted to the desired product.

*Example II*

Approximately 48.8 grams of a modified molecular sieve prepared by the procedure of Example I with the exception that the metal salt solution was a 5.0 percent by weight aqueous solution of $NiCl_2 \cdot 6H_2O$, were placed in a cylindrical chamber. Approximately 46.4 grams of a $C_3$ hydrocarbon feed comprised of 0.1 percent by weight propane, 93.3 percent by weight propylene, 0.8 percent by weigth propadiene, and 5.8 percent by weight methylacetylene were passed over the modified molecular sieve concurrently with hydrogen. The analyses of the product and conditions of operations are given in the following table.

Operating conditions: Sample
  Temperature, °C. _____ 250
  Pressure, p.s.i.a. _____ 14.7
  Hydrocarbon feed flow, liters/hour _____ 9.0
  Hydrogen flow, liters/hour _____ 3.0
Analysis (by weight percent):
  Propane _____ 4.9
  Propylene _____ 95.1
  Propadiene _____ None
  Methylacetylene _____ None
  Weight percent of total feed _____ 97.6

The amount of propylene originally present in the feed was approximately 43.3 grams of 93.3 percent purity. The products above represent a total of approximately 43.1 grams of propylene of 95.1 percent purity. It should be noted that though there is no increase in propylene concentration that all of the methylacetylene and propadiene have been removed from the product.

*Example III*

Approximately 46.8 grams of a modified molecular sieve prepared by the procedure of Example I with the metal salt solution being a 5.0 percent by weight aqueous solution of $CoCl_2 \cdot 6H_2O$, were placed in a cylindrical chamber. Approximately 31.2 grams of a $C_3$ hydrocarbon feed comprised of 0.3 percent by weight propane, 90.2 percent by weight propylene, 1.7 percent by weight propadiene, and 7.8 percent by weight methylacetylene were passed over the modified molecular sieve concurrently with hydrogen. The analysis of the product and conditions of operation are given in the following table:

Operating conditions: Sample
  Temperature, °C. _____ 250
  Pressure, p.s.i.a. _____ 14.7
  Hydrocarbon feed flow, liters/hour _____ 3.5
  Hydrogen flow, liters/hour _____ 2.0
Analysis (by weight percent):
  Propane _____ 0.9
  Propylene _____ 99.1
  Propadiene _____ None
  Methylacetylene _____ None
  Weight percent of total feed _____ 97.1

The amount of propylene originally present in the feed was approximately 28.2 grams of 90.2 percent purity. The products above represent a total of approximately 30.0 grams of propylene of 99.1 percent purity.

The modified molecular sieves used in this invention are prepared by treating a synthetic or naturally occurring zeolite with a solution comprised of a salt of a metal having the property of promoting hydrogenation and a suitable solvent therefor. Any of the zeolites presently known in the art as molecular sieves may be used in the practice of this invention. However, those zeolites which are calcium and/or sodium-alumino-silicates having pore diameters of 3 to 15 angstroms are preferred. A more preferred zeolite is a calcium-sodium-alumino-silicate zeolite having pore diameter of 4 and 5 angstroms. The hydrogenation promoting metals with which the molecular sieves are treated are metals selected from those included in Group VIII of the periodic table. The metals which are preferred in the practice of this invention are nickel, cobalt, iron, platinum and palladium. The molecular sieve zeolites may be either in pellet form or in particle form.

The amount of hydrogenation catalyzing metal present in the modified molecular sieve may vary according to the metal chosen and the particular type of zeolite being treated. Generally, however, the amount of metal placed in the molecular sieve will range from 0.05 to 20 percent by weight of the total molecular sieve. A more preferred range of concentrations of the metal is from 0.5 to 10 percent by weight of the total molecular sieve. The optimum metal concentrations are dependent primarily upon the metal being used.

To prepare the modified molecular sieve used in the present process, a salt of the desired hydrogenation-promoting metal is dissolved in a suitable solvent. The choice of both the metal salt and solvent is primarily a function of solubility. Water is a preferred solvent because of its availability, ease of handling, etc. Therefore, whenever possible, it is preferable to use water soluble salts of the metals. However, when water soluble salts are not available, solvents other than water may be used. However, since the method whereby the hydrogenation causing metal is placed on the molecular sieve zeolite is an ion-exchange reaction, the metal salt and the solvent must be selected so that salts which may be formed by cations released from the molecular sieve in the ion-exchange and the free anions of the solution will remain in solution and not form a solid which would precipitate out in the internal cavities of the molecular sieves. The concentration of the metal salt in the solvent will be dependent upon the amount of the hydrogenation promoting metal desired in the molecular sieve. The chosen molecular sieve is totally immersed in the metal salt solution. It is, of course, necessary that there be thorough contact between the salt solution and the molecular sieves. To insure thorough contact it may be desirable in some instances to provide some form of mild agitation. The time necessary for the ion-exchange reaction to go to completion or to the desired stopping point will vary according to the metal ion being exchanged and its concentration in the solution. Standard methods of quantitative analysis may be used to determine when equilibrium or a desired concentration has been reached and in many cases color changes as exemplified in Example I or other such simple tests may indicate completion of the ion-exchange reaction to a desired concentration.

After completion of the treating period the molecular sieve is filtered from the solution and dried slowly for a period of time from a temperature of 110 to 120° C. to approximately 350° C. The exact method and temperatures for drying are not critical in the preparation of the novel selective hydrogenation catalyst herein disclosed. However, care must be taken not to damage in any way the crystalline structure of the molecular sieve during the drying procedure. Upon completion of the drying operation a stream of hydrogen is passed over the treated molecular sieve for several minutes at a temperature of about 300° C. to 500° C. The modified molecular sieve is then ready for use in the novel process of the present invention.

In the preferred mode of practice, the process of the present invention comprises a single, continuous operation. The feedstream and hydrogen are introduced simultaneously into the presence of the modified molecular sieve, thereby having adsorption, hydrogenation and desorption all occurring concurrently. This preferred mode of practice is illustrated by Examples I, II, and III. The invention is not, however, limited to this single mode of practice but may be modified for a host of specific applications. For example, it may be desired to separate an n-mono-olefin from an n-diolefin and to recover as much of the n-diolefin as possible without hydrogenation. In this application the n-diolefins would first be adsorbed and then subjected to a mild desorption to remove as much of the n-diolefin as possible. After the mild desorption the remaining adsorbed diolefin would be subjected to hydrogenation-desorption. Another example would be found in the removal of impurities which are present in a feed stream in very small amounts. The process then might be advantageously employed as a long adsorption period followed by a hydrogenation-desorption to regenerate the molecular sieve. For other specific applications it may be advantageous to adsorb, purge with an inert gas, and then hydrogenate and desorb.

The hydrocarbon mixtures for which this invention finds particular application are those comprised of at least two hydrocarbons of different hydrocarbon types selected from the group consisting of n-acetylenic, n-polyolefinic and n-mono-olefinic hydrocarbons. The molecular weight of the hydrocarbons comprising the mixture may range from those containing only 2 carbon atoms up to those containing 9 to 12 carbon atoms and higher. The molecular weight limitations of the feed mixture are generally the same as those found in the molecular sieve separation processes of the prior art. However, due to the more efficient application of heat which results from the heat of hydrogenation produced within the internal cavity of the molecular sieve, hydrocarbons containing 2 to 3 more carbon atoms than those effectively treated in the prior art molecular sieve separations processes may be separated by utilizing the invention herein disclosed.

The optimum temperatures for the practice of the present invention are dependent upon a number of factors, foremost among these being the molecular weight and type of the hydrocarbons being separated, flow rates of both the hydrocarbon feed and the hydrogen, the composition of the particular modified molecular sieve being used, pressure and the degree of hydrogenation desired for the adsorbed hydrocarbon. The temperatures may range broadly from 0 to 500° C. with a more preferred range of operating temperatures being between 25 and 300° C. Generally, the effect of higher temperatures is cracking and some polymerization. At extremely high temperatures damage to the molecular sieve will occur.

The pressures which are contemplated in the practice of this invention may range from subatmospheric to 1000 p.s.i. and higher. A somewhat more preferred range is found between atmospheric pressure and 250 p.s.i. However, as indicated by Examples I, II, and III, excellent results may be obtained by operating at atmospheric pressure.

The degree of hydrogenation may be controlled by a proper balance between temperature and feed flow rates. At any given temperature, increases in flow rates will being about a decrease in the degree of hydrogenation. The range of flow rates may vary from 10 to 3000 gaseous volumes of feed per hour per volume of catalyst. A more preferred range of flow rates is 25 to 1000 gaseous volumes of feed per hour per volume of catalyst.

The method whereby the hydrocarbon mixture to be separated is brought into contact with the novel molecular sieves of this invention may be by any method known to the art. The process may be one involving gas-solid or liquid-solid contact. The molecular sieve bed may be stationary or fluidized. If fluidized, the molecular sieve bed may be a dry powder or pellets or may be slurried in an appropriate inert liquid. The arrangement of the apparatus necessary for carrying out any of the various possible utilities of the modified molecular sieves of this invention will depend largely upon the specific utility and will follow arrangements well known to the art with possibly some modifications necessary for specific adaptations.

The amount of hydrogen is not critical to the present invention. Any amount of hydrogen ranging from minor amounts to a considerable excess may be used. It is desired, however, for optimum results to use an approximate stoichiometric amount of hydrogen for the amount of material to be hydrogenated. This is not to be limiting, however, since it may be desired to use excess hydrogen so that hydrogen may be used as a purge gas as well as for the hydrogenation. Many specific applications may be found wherein other than the stoichiometric amount of hydrogen may be utilized.

What is claimed is:

1. A process for separating a mixture of at least two unsaturated straight-chain hydrocarbons of different degrees of unsaturation which comprises introducing said mixture concurrently with hydrogen and at a temperature of 0 to 500° C. into contact with a molecular sieve selected from the group consisting of sodium-alumino-silicates, calcium-alumino-silicates, and sodium-calcium-aluminosilicates, said molecular sieve having at least a portion of its ions replaced by ion exchange with a metal from Group VIII of the Periodic Table.

2. The process of claim 1 wherein the metal capable of promoting hydrogenation is selected from the group consisting of nickel, cobalt, iron, platinum and palladium.

3. The process of claim 1 wherein the contacting temperature is 25 to 250° C.

4. The process of claim 1 wherein the hydrocarbon mixture is introduced into contact with the molecular sieves at a rate of 10 to 2000 gaseous volumes of the hydrocarbon mixture per hour per volume of molecular sieve.

5. The process of claim 1 wherein the hydrocarbon mixture is introduced into contact with the molecular sieves at a rate of 25 to 1000 gaseous volumes of the hydrocarbon mixture per hour per volume of molecular sieve.

6. The process of claim 1 wherein the amount of Group VIII metal ion exchanged into the molecular sieve is within the range of from 0.05 to 20 percent by weight of the total molecular sieve.

7. The process of claim 1 wherein the hydrocarbon mixture is comprised of at least two different hydrocarbon types selected from the group consisting of n-acetylenic, n-polyolefinic and n-mono-olefinic hydrocarbons.

8. The process of claim 1 wherein the molecular sieve is one having pore diameters of at least 4 angstroms.

9. A process for the separation of a mixture comprised of at least two different unsaturated hydrocarbon types selected from the group consisting of n-acetylenic, n-polyolefinic and n-mono-olefinic hydrocarbons which comprises contacting said mixture with a molecular sieve selected from the group consisting of sodium-aluminosilicates, calcium-alumino-silicates, and sodium-calcium-alumino-silicates, said molecular sieve having at least a portion of its ions replaced by ion exchange with a metal from Group VIII of the Periodic Table, thereby causing the more unsaturated hydrocarbons to be selectively adsorbed and held, then ceasing contact between said molecular sieve and said hydrocarbon mixture and passing hydrogen into contact with said adsorbed hydrocarbons and said molecular sieves at a temperature of 0 to 500° C., causing said adsorbed hydrocarbons to be hydrogenated to more saturated hydrocarbons thereby causing said adsorbed hydrocarbons to be more easily desorbed from the internal cavities of said molecular sieves.

10. The process of claim 9 wherein the amount of hydrogenation promoting metal contained in the molecular sieve is 0.5 to 10 percent by weight of the total molecular sieve.

11. The process of claim 9 wherein the metal capable of promoting hydrogenation is selected from the group consisting of nickel, cobalt, iron, platinum and palladium.

12. The process of claim 9 wherein the Group VIII metal ion exchanged into the molecular sieve is within the range of 0.05 to 20 percent by weight of the total molecular sieve.

13. The process of claim 9 wherein the molecular sieve is one having pore diameters of at least 4 angstroms.

14. The process of claim 9 wherein the contacting temperature is 25 to 250° C.

References Cited by the Examiner

UNITED STATES PATENTS

| | | | |
|---|---|---|---|
| 2,451,327 | 10/1948 | Fasce et al. | 260—677 |
| 2,900,430 | 8/1959 | Henke et al. | 260—679 |
| 2,935,459 | 5/1960 | Hess et al. | 260—676 |
| 2,946,829 | 7/1960 | Likins et al. | 260—677 |
| 2,959,627 | 11/1960 | Fleming et al. | 260—677 |
| 2,976,331 | 3/1961 | Kimberlin et al. | 260—676 |
| 3,033,778 | 5/1962 | Frilette et al. | 260—682 |
| 3,036,137 | 5/1962 | Challis et al. | 260—677 |
| 3,075,023 | 1/1963 | Garrison et al. | 260—676 |
| 3,106,593 | 10/1963 | Benesi et al. | 260—681.5 |
| 3,140,322 | 7/1964 | Frilette et al. | 260—677 |

OTHER REFERENCES

Weisz et al., "Journal of Physical Chemistry," March 29, 1960, vol. 64, No. 3, page 382.

ALPHONSO D. SULLIVAN, *Primary Examiner.*

J. ZIEGLER, D. S. ABRAMS, *Assistant Examiners.*